US012723290B2

(12) United States Patent
Takenouchi et al.

(10) Patent No.: US 12,723,290 B2
(45) Date of Patent: Sep. 1, 2026

(54) METHOD FOR TREATING SULFIDE

(71) Applicant: SUMITOMO METAL MINING CO., LTD., Tokyo (JP)

(72) Inventors: Hiroshi Takenouchi, Niihama (JP); Shin-ichi Heguri, Niihama (JP); Satoshi Asano, Niihama (JP); Hirofumi Shouji, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 502 days.

(21) Appl. No.: 18/020,439

(22) PCT Filed: Aug. 5, 2021

(86) PCT No.: PCT/JP2021/029115
§ 371 (c)(1),
(2) Date: Feb. 9, 2023

(87) PCT Pub. No.: WO2022/039039
PCT Pub. Date: Feb. 24, 2022

(65) Prior Publication Data

US 2023/0295766 A1 Sep. 21, 2023

(30) Foreign Application Priority Data

Aug. 17, 2020 (JP) ................................ 2020-137417

(51) Int. Cl.
*C22B 3/10* (2006.01)
*C22B 3/46* (2006.01)
*H01M 10/54* (2006.01)

(52) U.S. Cl.
CPC ................. *C22B 3/10* (2013.01); *C22B 3/46* (2013.01); *H01M 10/54* (2013.01)

(58) Field of Classification Search
CPC .. C22B 3/10; C22B 3/46; C22B 3/065; C22B 7/005; C22B 15/0071; C22B 23/0415; C22B 23/0461; C22B 3/08; C22B 3/44; H01M 10/54; B09B 3/40; B09B 2101/16; B09B 3/70
USPC .......................................................... 75/743
See application file for complete search history.

(56) References Cited

U.S. PATENT DOCUMENTS

| | | | |
|---|---|---|---|
| 3,793,429 | A | 2/1974 | Queneau et al. |
| 3,880,653 | A | 4/1975 | Hougen |
| 3,975,189 | A | 8/1976 | Haugen |
| 4,401,630 | A | 8/1983 | Ettell et al. |
| 4,431,613 | A | 2/1984 | Verbaan |
| 6,440,194 | B1 | 8/2002 | Krofchak et al. |
| 2003/0066389 | A1 | 4/2003 | Kudo et al. |
| 2013/0269484 | A1 | 10/2013 | Ishida et al. |
| 2013/0287621 | A1 | 10/2013 | Fujita et al. |
| 2014/0174256 | A1 | 6/2014 | Takahashi et al. |
| 2014/0322109 | A1 | 10/2014 | Nakai et al. |
| 2020/0216929 | A1* | 7/2020 | Higaki ................ C22B 15/0056 |
| 2021/0180154 | A1 | 6/2021 | Takenouchi et al. |
| 2021/0376399 | A1* | 12/2021 | Morin ..................... C22B 1/005 |

FOREIGN PATENT DOCUMENTS

| | | | |
|---|---|---|---|
| CA | 1152337 | A | 8/1983 |
| CA | 1327452 | C | 3/1994 |
| CA | 2360608 | A1 | 5/2002 |
| CA | 2481729 | A1 | 3/2005 |
| CA | 2639796 | A1 | 6/2007 |
| CA | 3076598 | A1 | 5/2019 |
| CA | 3085965 | A1 | 8/2019 |
| CN | 1115338 | A | 1/1996 |
| CN | 1172167 | A | 2/1998 |
| CN | 101285127 | A | 10/2008 |
| CN | 101298638 | A | 11/2008 |
| CN | 101555556 | A | 10/2009 |
| CN | 104911359 | A | 9/2015 |
| CN | 105063349 | A | 11/2015 |
| CN | 106505272 | A | 3/2017 |
| CN | 107779595 | A | 3/2018 |
| EP | 0248518 | A1 | 12/1987 |
| EP | 3690068 | A1 | 8/2020 |

(Continued)

OTHER PUBLICATIONS

Daniel C. Harris [A book of “Quantitative Chemical Analysis”, Seventh Edition, Printed on 2007] (Year: 2007).*

Extended European Search Report issued Sep. 3, 2024 in the EP Patent Application No. 21858186.6.

Office Action issued in the U.S. Appl. No. 17/252,354, mailed on Dec. 13, 2023.

Office Action issued in the U.S. Appl. No. 16/641,669, mailed on Mar. 10, 2022.

Physics, Chemistry, Liao Hept, Liao ning Person Press, p. 165, Nov. 1987, (The machine translation of the Aug. 30, 2021 Office Action issued for CN201880056786.5 serves as a concise explanation of the relevance).

(Continued)

*Primary Examiner* — Sally A Merkling
*Assistant Examiner* — Nazmun Nahar Shams
(74) *Attorney, Agent, or Firm* — Troutman Pepper Locke LLP; James E. Armstrong, IV

(57) ABSTRACT

Provided is a method for treating a sulfide, the method being suitable for obtaining nickel and/or cobalt from a sulfide containing copper and nickel and/or cobalt. The method relates to a method for treating a sulfide containing copper and nickel and/or cobalt, the method including pulverizing the sulfide by subjecting the sulfide to a pulverizing treatment so as to obtain a pulverized sulfide having a particle size of 800 μm or less; and leaching the pulverized sulfide by subjecting the pulverized sulfide to a leaching treatment with an acid under a condition in which a sulfurizing agent is present to obtain a leachate. For example, the sulfide to be treated is generated by reducing, heating, and melting a waste lithium-ion battery to obtain a molten body and adding a sulfurizing agent to the molten body to sulfurize the molten body.

17 Claims, No Drawings

(56) References Cited

FOREIGN PATENT DOCUMENTS

| | | | |
|---|---|---|---|
| JP | S56-134505 | A | 10/1981 |
| JP | S57-131332 | A | 8/1982 |
| JP | S63-259033 | A | 10/1988 |
| JP | H02-197533 | A | 8/1990 |
| JP | H09-082371 | A | 3/1997 |
| JP | 2003-082421 | A | 3/2003 |
| JP | 2005-089808 | A | 4/2005 |
| JP | 2007-191769 | A | 8/2007 |
| JP | 2007-323868 | A | 12/2007 |
| JP | 2009-097076 | A | 5/2009 |
| JP | 2010-100938 | A | 5/2010 |
| JP | 2010-277868 | A | 12/2010 |
| JP | 2012-107264 | A | 6/2012 |
| JP | 2012-138301 | A | 7/2012 |
| JP | 2012-172169 | A | 9/2012 |
| JP | 2015-183292 | A | 10/2015 |
| JP | 2016-102251 | A | 6/2016 |
| JP | 2017-036489 | A | 2/2017 |
| JP | 2017-155280 | A | 9/2017 |
| JP | 2017-155281 | A | 9/2017 |
| JP | 2018-040035 | A | 3/2018 |
| JP | 2020-029586 | A | 2/2020 |
| WO | 2012/102384 | A1 | 8/2012 |
| WO | 2013/077296 | A1 | 5/2013 |
| WO | 2019/124015 | A1 | 6/2019 |

OTHER PUBLICATIONS

Office Action issued in the related CN Patent Application No. 201880056786.5, mailed on Aug. 30, 2021 and English translation thereof.

B. Friedrich et al. "Status and Trends of industrialized Li-Ion battery recycling processes with qualitative comparison of economic and environmental impacts", Rwthaachen University, Sep. 21, 2017, pp. 1-19.

J. Kang et al. "Preparation of cobalt oxide from concentrated cathode material of spent lithium ion batteries by hydrometallurgical method", Advanced Powder Technology, Elsevier BV, NL, vol. 21, No. 2, Mar. 1, 2010, pp. 175-179.

Extended European Search Report issued in the EP Patent Application No. 18860201.5, mailed on Apr. 22, 2021.

Office Action issued in the CA Patent Application No. 3077604, mailed on May 11, 2021.

Office Action issued in the CA Patent Application No. 3072317, mailed on May 12, 2021.

A. A. Palant et al: "Leaching kinetics of the magnetic fraction of converter matte in sulfuric acid and hydrochloric acid solutions", Russian Metallurgy, vol. 2010, No. 12, Dec. 31, 2010, pp. 1110-1113.

F. Huang et al. "Selective recovery of valuable metals from nickel converter slag at elevated temperature with sulfuric acid solution", Separation and Purification Technology, vol. 156, Oct. 23, 2015, pp. 572-581.

Extended European Search Report issued in the EP Patent Application No. 18870066.0, mailed on Jun. 10, 2021.

Y. Xie et al "Recovery of nickel, copper and cobalt from low-grade Ni—Cu sulfide tailings", Hydrometallurgy, Elsevier Scientific Publishing Cy. Amsterdam, NL, vol. 80, No. 1-2, Nov. 1, 2005, pp. 54-58.

Extended European Search Report issued in the EP Patent Application No. 18871166.7, mailed on Jun. 10, 2021.

International Search Report including Written Opinion issued in the International Application No. PCT/JP2018/033682 dated Nov. 20, 2018 and English translation thereof.

Office Action issued in the KR Patent Application No. KR10-2020-7006158, mailed on Jun. 19, 2020.

Office Action issued in the CN Patent Application No. CN201880056267.9, mailed on Jul. 21, 2020.

Buschow, K.H. et al. "Hydrogen-Metal Systems: Technological and Engineering Aspects", Encyclopedia of Materials—Science and Technology, vols. 1-11—Hydrometallurgical Principles. Elsevier.p. 3970-3988 (2001). (Year: 2001).

D. Dreisinger. "Copper leaching from primary sulfides: Options for biological and chemical extraction of copper." Hydrometallurgy 83. 1-4 (2006): 10-20. (Year: 2006).

Office Action issued in the U.S. Appl. No. 16/648,480, mailed on Jun. 26, 2020.

Office Action issued in the U.S. Appl. No. 16/648,480, mailed on Nov. 12, 2020.

International Search Report including Written Opinion issued in the International Application No. PCT/JP2018/033683 dated Nov. 6, 2018 and English translation thereof.

International Search Report including Written Opinion issued in the International Application No. PCT/JP2018/030801 dated Oct. 30, 2018 and English translation thereof.

V. P. Stefanova et al. "Copper, Nickel and Cobalt Extraction from FeCuNiCoMn Alloy Obtained after Pyrometallurgical Processing of Deep Sea Nodules" Proceedings of the Tenth (2013) Isope Ocean Mining and Gas Hydrates Symposium, Sep. 22, 2013, pp. 180-184.

International Search Report including Written Opinion issued in the International Application No. PCT/JP2018/043846 dated Jan. 29, 2019 and English translation thereof.

International Search Report issued in the International Application No. PCT/JP2019/024805 dated Jul. 30, 2019 and English translation thereof.

Office Action issued in the CA Patent Application No. 3187383, mailed on May 29, 2024.

"Hydrometallurgy", written by Yang Xianwan et al., p. 406, Metallurgical Industry Press, 2nd edition, 1st printing, Dec. 2011, with English translation.

Office Action issued Jul. 2, 2025 in the CN Patent Application No. CN201880080300.1, with English translation.

Huang Qixing et al "Nickel Metallurgy", China Science and Technology Press, pp. 240-241, 247-249, Aug. 1990, 1st edition, 1st printing; with machine translation.

Office Action issued in Chinese Patent Application No. CN 201980039093.X, mailed Apr. 22, 2026, with machine translation.

* cited by examiner

METHOD FOR TREATING SULFIDE

TECHNICAL FIELD

The present invention relates to a method for treating a sulfide containing copper and nickel and/or cobalt.

BACKGROUND ART

A lithium-ion battery (hereinafter, also referred to as an "LIB") having a feature of being light and having a high output is mounted on a vehicle such as an electric vehicle or a hybrid vehicle and a mobile phone, a smartphone, an electronic device such as a personal computer, or the like.

The LIB has a structure including a negative electrode material, a positive electrode material, and a separator which are placed in an outer can and are impregnated with an organic solvent as an electrolytic solution. The negative electrode material includes a negative electrode active material such as graphite which is fixed to a surface of a copper foil as a negative electrode current collector, the positive electrode material includes a positive electrode active material such as lithium nickelate or lithium cobaltate which is fixed to a positive electrode current collector made of an aluminum foil, the separator is made of a porous resin film of polypropylene or the like, and the organic solvent contains an electrolyte such as lithium hexafluorophosphate ($LiPF_6$).

When an LIB is built in a vehicle or an electronic device or the like as described above, and is used, the LIB eventually cannot be used any longer due to degradation of the automobile or electronic device or the LIB's life, etc., and turns into a waste lithium-ion battery (waste LIB). Waste LIBs also include those generated as defective products in the manufacturing process. These waste LIBs contain valuable components such as nickel, cobalt, and copper, and it is desired to recover and reuse such valuable components for effective utilization of resources.

Generally, when it is desired to efficiently recover valuable components from equipment made of metal, members made of metal, or materials made of metal, a pyrometallurgical treatment using a technique of pyrometallurgical smelting is considered to be easy: the equipment, members, or materials are fed into a furnace and all are melted under high temperatures to separate them into metal, i.e., a valuable matter, and a slag to be disposed of.

For example, Patent Document 1 discloses a method of recovering a valuable metal using a pyrometallurgical treatment. By applying the method disclosed in Patent Document 1 as described above to valuable metal recovery from waste LIBs, a copper alloy containing nickel or the like can be obtained. According to the method using the pyrometallurgical treatment, although there is a problem that energy is required for heating to a high temperature, the method has an advantage that various impurities can be processed in a simple process and separated collectively. Further, since the slag obtained is in a relatively chemically stable state, there is no risk of causing an environmental problem, which is advantageous in that waste disposal is easy.

However, when a waste LIB is treated by the pyrometallurgical treatment, some of valuable components, particularly most of cobalt, are distributed into the slag, which inevitably ends up in a loss. Further, since the metal obtained by the pyrometallurgical treatment is an alloy in which a valuable component is present, in order to reuse the recovered metal, a purification treatment is required in which the metal is separated from the alloy for the respective components and impurities are removed.

As a purification method which has been generally used in the pyrometallurgical process, there is a method in which, for example, separation of copper and lead and separation of lead and zinc are performed by slow cooling from a molten state at a high temperature. However, when copper and nickel are main components as in waste LIBs, the copper and nickel are uniformly melted in the entire composition range. Accordingly, even when they are slowly cooled, the copper and nickel are only mixed and solidified in a layered form, so that they cannot be effectively separated.

There is another purification method, in which nickel is subjected to a disproportionation reaction using carbon monoxide (CO) gas to vaporize nickel from copper and cobalt, whereby nickel is separated. However, there is a problem that use of CO gas, which is extremely poisonous, makes it difficult to ensure safety.

Further, as a method of separating copper and nickel which has been industrially performed, there is a method of crude separation of a mixture matte (sulfide). This method produces a matte containing copper and nickel in a smelting process, and separates this into a sulfide containing a larger amount of copper and a sulfide containing a larger amount of nickel by slow cooling in the same manner as in the case described above. However, since the separation of copper and nickel remains at a crude separation degree even in this method, in order to obtain nickel or copper having high purity, a further separation process such as electrolytic purification is required.

As another method, a method of using vapor pressure difference through chlorides has also been studied. However, since the process includes handling a large amount of toxic chlorine, it is difficult to say that the method is industrially suitable from a viewpoint of equipment corrosion measures, safety measures, or the like.

In addition, the above applies to separation of copper and cobalt and separation of cobalt and nickel.

Thus, compared with the hydrometallurgical process, separation and purification of each element by the pyrometallurgical process had disadvantage of remaining at the crude separation level or high cost, and likelihood in practical use of the pyrometallurgical process was low.

On the other hand, the method by the hydrometallurgical smelting, which uses acid or a treatment such as a neutralization treatment or a solvent extraction treatment, has an advantage that an amount of energy consumption is small and mixed valuable components can be individually separated and directly recovered with high purity grade. However, when a waste LIB is treated using the hydrometallurgical treatment, a hexafluorophosphate anion which is a component of the electrolytic solution contained in the waste LIB is a product difficult to dispose of and cannot be completely decomposed even at a high temperature and by a high concentration sulfuric acid. Hexafluorophosphate anions mix in an acid solution in which the valuable components are leached. Furthermore, since a hexafluorophosphate anion is a water-soluble phosphate ester, it is also difficult to recover phosphorus or fluorine from an aqueous solution after recovering valuable matters. Therefore, it is necessary to take various measures for regulated release into public sea areas and the like.

In addition, it is not easy to efficiently leach only valuable components from a waste LIB using only an acid and obtain a solution which can be subjected to purification. That is, the waste LIB itself is difficult to be leached, and it is not easy to leach valuable components at a sufficient leaching ratio.

Further, when a waste LIB is forcibly leached using an acid having strong oxidizing power, large amounts of aluminum, iron, manganese, and the like, which are not recovery targets, are also leached together with valuable components, and there is a problem that an addition amount of a neutralizing agent for treating these with neutralization or an amount of wastewater handled increases.

Furthermore, when pH of a liquid needs to be adjusted or impurities need to be neutralized to be fixed as precipitates, in order to subject the acidic leachate to a separation means such as solvent extraction or ion exchange, an amount of precipitates generated in the neutralization is also increased. There are, thus, many problems in terms of securing processing sites and securing stability, and the like.

Furthermore, electrical charges sometimes remain in the waste LIB. When mechanical machining such as direct crushing or cutting is directly applied to waste LIB main bodies, the positive electrode and the negative electrode in the waste LIB directly contact with each other and excessive current flows at once. There is a risk that this causes heat generation, explosion, or the like. Therefore, this requires treatments which need effort, such as immersing the waste LIB in a highly conductive solution such as brine to put the positive electrode and the negative electrode in a state in which they are connected via a certain resistance so that the waste LIB discharges.

Thus, it could not be always said to be an advantageous method to treat waste LIBs using only the hydrometallurgical treatment.

Thus, an attempt has been made to treat a waste LIB which is difficult to treat by the above-described pyrometallurgical treatment or hydrometallurgical treatment alone, by a method in which the pyrometallurgical treatment and the hydrometallurgical treatment are combined, that is, an attempt, in which impurities are removed as much as possible by the pyrometallurgical treatment such as roasting the waste LIB to convert it to a uniform waste LIB treated product, and the treated product obtained is subjected to the hydrometallurgical treatment to separate the treated product into a valuable component and the other components has been made.

In the method in which the pyrometallurgical treatment and the hydrometallurgical treatment are combined as described above, fluorine or phosphorus of the electrolytic solution is vaporized and removed in the pyrometallurgical treatment, and members made of organic materials such as plastics which constitute structural components of the waste LIB, or a separator are also decomposed by heat. Furthermore, since the waste LIB treated product obtained in the pyrometallurgical treatment is obtained in a uniform state, it is easy to handle it as a uniform raw material even during the hydrometallurgical treatment.

However, the problem of recovery loss that cobalt contained in the waste LIB as described above is distributed to the slag still remains by merely combining the pyrometallurgical treatment and the hydrometallurgical treatment.

In this respect, a method has been considered, in which a waste LIB is reduced and melted while adjusting an atmosphere and temperature, the degree of reduction, etc. in the pyrometallurgical treatment so that cobalt is distributed as a metal and cobalt is less likely to be distributed to the slag. However, the metal obtained by such a method becomes a copper-based sparsely soluble and corrosion resistant alloy containing nickel and cobalt. Even if an attempt is made to separate and recover valuable components from the corrosion resistant alloy, acid dissolution is difficult and cannot be effectively recovered.

In addition, when the corrosion resistant alloy is dissolved in acid using, for example, chlorine gas, the obtained solution (leachate) contains a high concentration of copper and a relatively low concentration of nickel or cobalt. Among them, although nickel and cobalt can be easily separated using a known method such as solvent extraction, it is difficult to separate a large amount of copper from nickel and cobalt easily at low costs.

Thus, it has been difficult to efficiently separate only nickel and/or cobalt from waste LIBs containing various components besides copper, nickel, and cobalt, which are valuable components. In particular, it has been difficult to separate only nickel and/or cobalt from a sulfide containing copper and nickel and/or cobalt by the hydrometallurgical treatment, the sulfide containing copper and nickel and/or cobalt being generated by adding a sulfurizing agent such as elemental sulfur (solid sulfur) to a molten body obtained by reducing, heating, and melting waste LIBs in the pyrometallurgical treatment and subjecting the molten body to the sulfurization treatment.

Incidentally, the problems described above are similarly present in the case of separating copper, nickel, and cobalt from waste batteries containing copper, nickel, and cobalt other than the waste LIBs, also present in the case of separating copper, nickel, and cobalt from alloys containing copper, nickel, and cobalt derived from other than waste batteries.

Patent Document 1: Japanese Unexamined Patent Application, Publication No. 2012-172169 Patent Document 2: Japanese Unexamined Patent Application, Publication No. S63-259033

DISCLOSURE OF THE INVENTION

Problems to be Solved by the Invention

The present invention has been made in view of such circumstances, and it is an object of the present invention to provide a method for treating a sulfide capable of selectively separating nickel and/or cobalt from a sulfide containing copper, nickel, and/or cobalt, for example, obtained by subjecting a waste LIB to the pyrometallurgical treatment.

Means for Solving the Problems

The present inventors have conducted intensive studies in order to solve the aforementioned problems. As a result, it has been found that the above problem can be solved by pulverizing a sulfide (a sulfide to be treated) containing copper and nickel and/or cobalt so as to have a size which is no greater than a predetermined particle size, and subjecting the pulverized sulfide obtained to a leaching treatment with an acid under a condition in which a sulfurizing agent is present, thereby completing the present invention.

A first aspect of the present invention relates to a method for treating a sulfide containing copper and nickel and/or cobalt, the method including:

pulverizing the sulfide by subjecting the sulfide to a pulverizing treatment to obtain a pulverized sulfide having a particle size of 800 μm or less; and leaching the pulverized sulfide by subjecting the pulverized sulfide to a leaching treatment with an acid under a condition in which a sulfurizing agent is present, to obtain a leachate.

A second aspect of the present invention relates to the method for treating a sulfide as described in the first aspect, in which, in the leaching step, a leaching treatment is performed with at least one or more types selected from sulfuric acid, hydrochloric acid, and nitric acid to obtain a leachate.

A third aspect of the present invention relates to the method for treating a sulfide as described in the first or second aspect, further including reducing the leachate by using a metal that has a lower standard reduction potential than copper.

A fourth aspect of the present invention relates to the method for treating a sulfide as described in the third aspect, further including oxidizing and neutralizing a solution obtained in the reduction step by adding an oxidant and a neutralizing agent to the solution obtained in the reduction step, to obtain a solution containing nickel and/or cobalt.

A fifth aspect of the present invention relates to the method for treating a sulfide as described in the fourth aspect, in which the oxidant is one or more types selected from hydrogen peroxide and hypochlorous acid.

A sixth aspect of the present invention relates to the method for treating a sulfide as described in the fourth or fifth aspect, in which the neutralizing agent is one or more types selected from sodium hydroxide and potassium hydroxide.

A seventh aspect of the present invention relates to the method for treating a sulfide as described in any one of the first to sixth aspects, in which the sulfide is generated by adding a sulfurizing agent to a molten body obtained by reducing, heating, and melting a waste lithium-ion battery.

An eighth aspect of the present invention relates to a method of recovering a valuable metal from a waste lithium-ion battery, including obtaining a leachate by leaching a sulfide containing copper and nickel and/or cobalt with an acid, the sulfide being generated by sulfurizing a molten body obtained by reducing, heating, and melting the waste lithium-ion battery. In the leachate-obtaining step, the sulfide is subjected to a pulverizing treatment so as to have a particle size of 800 μm or less and the pulverized sulfide is subjected to a leaching treatment with an acid under a condition in which a sulfurizing agent is present.

A ninth aspect of the present invention relates to a method of recovering a valuable metal from a waste lithium-ion battery, the method including a pyrometallurgical treatment, in which the waste lithium-ion battery is reduced, heated, and melted to obtain a molten, and sulfurizing the molten body to obtain a sulfide containing copper and nickel and/or cobalt, and a hydrometallurgical treatment, in which the sulfide is leached with an acid. In the hydrometallurgical treatment, the sulfide is pulverized so as to have a particle size of 800 μm or less, and the pulverized sulfide is subjected to a leaching treatment with an acid under a condition in which a sulfurizing agent is present.

Effects of the Invention

According to the present invention, nickel and cobalt can be efficiently and selectively separated from a sulfide containing copper and nickel and/or cobalt.

PREFERRED MODE FOR CARRYING OUT THE INVENTION

Hereinafter, specific embodiments of the present invention (hereinafter, referred to as "present embodiments") will be described in detail. The present invention is not limited to the following embodiments in any way and can be implemented within the scope of the object of the present invention with appropriate modifications. Note that, in this specification, the notation "X to Y" (X and Y are arbitrary numerical values) means "X or more and Y or less".

<<1. Summary>>

The method for treating a sulfide of the present invention is a method for treating a sulfide containing copper and nickel and/or cobalt, and is a method for selectively separating nickel and/or cobalt from the sulfide. The sulfide to be treated is, for example, a sulfide containing copper and nickel and/or cobalt, and the sulfide is generated in the pyrometallurgical treatment, in which a waste lithium-ion battery (waste LIB) is reduced, heated, and melted to obtain a molten body, and the molten body obtained is sulfurized by adding a sulfurizing agent such as elemental sulfur to the molten body obtained to obtain the sulfide containing copper and nickel and/or cobalt.

Specifically, the method for treating a sulfide of the present invention is characterized in that the method includes pulverizing the sulfide by subjecting the sulfide to a pulverizing treatment to obtain a pulverized sulfide having a particle size of 800 μm or less, and leaching the pulverized sulfide obtained by subjecting the pulverized sulfide to a leaching treatment using an acid under a condition in which a sulfurizing agent is present, to obtain a leachate.

As described above, as a method for treating a sulfide containing copper and nickel and/or cobalt, the particle size of the sulfide is set to 800 μm or less, and the pulverized sulfide is leached with an acid under a condition in which a sulfurizing agent is present, whereby nickel and cobalt can be leached at a good leaching speed, and copper can be precipitated as copper sulfide, so that nickel and cobalt can be extremely selectively leached into the leachate and can be effectively separated from copper.

Here, examples of the sulfide to be treated include a sulfide generated by the pyrometallurgical treatment, in which, as described above, a waste lithium-ion battery (waste LIB) is reduced, heated, and melted to obtain a molten body, and the molten body is sulfurized by adding a sulfurizing agent such as elemental sulfur to the molten body obtained. In addition, the sulfide may be a sulfide generated in the pyrometallurgical treatment of a waste battery other than the lithium-ion battery, the waste battery containing copper and nickel and/or cobalt. Further, the sulfide is not limited to a sulfide from batteries, and may be a sulfide generated by subjecting a material containing copper and nickel and/or cobalt to the pyrometallurgical treatment or the like. Note that the waste battery including a waste LIB refers to a waste due to deterioration of an automobile or an electronic device or the like, a scrap of a battery generated due to the life of the battery, or a waste battery including a defective product in a battery manufacturing process, a used battery, or a battery disposed of as a defective product or the like in a battery manufacturing process.

<<2. Method of Treating Sulfide>>

Hereinafter, as a specific embodiment of the present invention (hereinafter, referred to as "the present embodiment"), a case in which a sulfide containing copper and nickel and/or cobalt, which is obtained through the pyrometallurgical treatment of a waste LIB, is a target of the treatment will be more specifically described as an example.

The method of treating a sulfide as described in the present embodiment has a pulverizing step S1 in which the sulfide is subjected to a pulverizing treatment to obtain a pulverized sulfide, and a leaching step S2 in which the pulverized sulfide is subjected to a leaching treatment with an acid to obtain a leachate. Further, the method may include a reduction step S3 in which the leachate obtained is subjected to a reduction treatment to obtain a reduced solution, and may include an oxidation and neutralization step S4 in which the reduced solution obtained is subjected to an oxidation and neutralization treatment by adding an oxidant and a neutralizing agent.

Here, with respect to the sulfide which is a target of the treatment, the sulfide obtained through the pyrometallurgical treatment of a waste LIB is specifically a sulfide containing copper and nickel and/or cobalt, which is obtained by reducing, heating, and melting a waste LIB to obtain a molten body and the molten body obtained is sulfurized by adding a sulfurizing agent such as elemental sulfur to the molten body obtained.

Specifically, in the above-described pyrometallurgical treatment, firstly, a treatment in which a waste LIB is charged into a roasting furnace and oxidized and roasted at a temperature of about 300° C. to 1000° C. is performed. Then, a reduction and heating treatment in which the obtained roasted product (post-roasting product) is charged into a melting furnace such as a crucible made of graphite or a crucible made of magnesium and melted at a high temperature condition of about 1100° C. to 1400° C. is performed.

Subsequently, a sulfurization treatment is performed by adding elemental sulfur (solid sulfur) or a sulfurizing agent such as a liquid or gaseous sulfurizing agent including sodium hydrogen sulfide, sodium sulfide, hydrogen sulfide gas, or the like to the molten body obtained by the reduction, heating, and melting. Thereby, a sulfide containing copper and nickel and/or cobalt, which are metal components that constituted the waste LIB, can be obtained. Note that, in this specification, matter including copper, the majority of which is in the form of a sulfide, and nickel, cobalt, or a portion of the copper in an unsulfurized state, present as a metal or in a partially oxygen-containing form, or the like, is collectively referred to as a "sulfide".

[Pulverizing Step]

In the pulverizing step S1, the sulfide containing copper and nickel and/or cobalt is pulverized to a predetermined particles size or less to obtain a pulverized sulfide. Specifically, the sulfide is pulverized so that the particle size is 800 μm or less.

By pulverizing the sulfide in this manner to obtain a pulverized sulfide having a particle size of 800 μm or less, when the pulverized sulfide is subjected to the treatment in the next step, i.e., the leaching step S2, the leaching speed can be increased, which can increase the leaching efficiency of nickel and cobalt. Note that, as will be described in detail later, in the leaching treatment in the leaching step S2, the acid leaching is performed in the presence of a sulfurizing agent, and therefore copper can be efficiently fixed as copper sulfide in the sulfide, and nickel and/or cobalt can be selectively leached into the leachate obtained and can be separated.

It is preferable to pulverize the sulfide so that the particle size is 700 μm or less, and it is more preferable to pulverize the sulfide to 500 μm or less. Note that, although there is no particular limitation on the lower limit value of the particle size, when the particle size is too small, handling is difficult, and at the same time, hydrogen sulfide gas or the like may be generated in the leaching treatment, which is not preferable. From such a viewpoint, it is preferable to set the lower limit value of the particle size to 100 μm or more.

The method (pulverization method) in the pulverizing treatment is not particularly limited as long as the sulfide can be pulverized to 800 μm or less. For example, the sulfide can be pulverized by a method using a known pulverizing instrument such as a jaw crusher or a vibration mill. Note that the particle size of the pulverized sulfide can be measured by, for example, a laser diffraction scattering method.

[Leaching Step]

In the leaching step S2, a leaching treatment with an acid is performed on the pulverized sulfide to obtain a leachate. At this time, the present embodiment is characterized in that the leaching treatment is performed under a condition in which a sulfurizing agent is present. According to such a method, nickel and/or cobalt contained in the pulverized sulfide is leached and a leachate is obtained.

As described above, in the method for treating sulfide of the present embodiment, a pulverized sulfide of 800 μm or less is used as a target of the leaching treatment. Since most of copper is contained in the form of sulfide, it is possible to increase the leaching speed compared with, for example, a copper-based corrosion resistant alloy. Furthermore, since the leaching treatment is applied to the sulfide pulverized to a particle size of 800 μm or less, it is possible to increase the leaching speed by acid, which improves the leaching ratio.

However, it has been clarified by the study of the present inventors that, while the leaching speed can be increased, copper in an unsulfurized state contained in the pulverized sulfide is also leached together with nickel and/or cobalt, so that the separability from copper is lowered even if the leaching speed is increased. Note that, in the reduction step S3 described below, it is also possible to separate the leached copper by reduction of the copper, but it is preferable to separate copper as much as possible while the copper is present in the leachate, from the viewpoint of productivity. The reason for this is that it takes a long time for the reduction treatment and the amount of the reducing agent used to reduce much copper is also increased if the concentration of copper in the leachate is too high.

Therefore, in the method for treating a sulfide as described in the present embodiment, the sulfide is brought into contact with acid in the leaching treatment, in a state in which the sulfurizing agent is present, whereby copper contained in the pulverized sulfide is sulfurized by the sulfurizing agent so as to be precipitated as copper sulfide. The copper sulfide contained in the pulverized sulfide is precipitated in the leachate as a solid copper sulfide as it is. In this way, both copper sulfide contained in the pulverized sulfide and copper contained in an unsulfurized state in the pulverized sulfide are effectively precipitated or deposited as copper sulfide, so that only nickel and cobalt contained in the pulverized sulfide can be selectively leached into the leachate. In addition to the leaching speed being improved, nickel and cobalt can be extremely effectively separated from copper.

As the acid, sulfuric acid, hydrochloric acid, nitric acid, or the like can be used, and one type of these acids can be used alone or a combination of a plurality of them may be used. In addition, a chloride may be contained in sulfuric acid, and this may be used as the acid. Among them, sulfuric acid is preferably used. From the viewpoint of realizing a so-called "battery-to-battery", which is an idealistic circulation method in which a waste LIB is recycled and supplied to an LIB raw material again, by using sulfuric acid as an acid, a leachate can be obtained in the form of a sulfate which is easily utilized for a positive electrode material of lithium-ion batteries.

As an amount of the acid, an amount of 1 equivalent or more, preferably 1.2 equivalents or more, and more preferably 1.2 equivalents or more and 11 equivalents or less, based on the total amount of nickel and/or cobalt contained in the pulverized sulfide, is used. The reaction speed can be increased by increasing an acid concentration.

Further, as the sulfurizing agent used in the leaching treatment, sodium hydrosulfide or elemental sulfur can be used. When elemental sulfur is used, it is preferable to appropriately pulverize so that the reaction can proceed easily.

The amount of the sulfurizing agent is preferably 1 or more equivalents with respect to the amount of copper contained in the pulverized sulfide.

It is preferable to determine appropriate ranges of the temperature and time period of the leaching treatment, and the concentration of a slurry obtained by adding an acid and a sulfurizing agent to the pulverized sulfide, by performing a preliminary test, in advance.

In particular, in the leaching treatment, it is preferable to measure a redox potential (ORP) and pH of the leachate and to control them in predetermined ranges. Specifically, the ORP is preferably controlled to be −200 mV or more and 300 mV or less as measured using a silver/silver chloride electrode as a reference. Further, it is preferable to control the pH to 0.5 or more and 1.6 or less. Within such ranges, leaching is promoted, and it is possible to suppress redissolution of precipitated or deposited copper sulfide by excessive oxidation.

Note that the end point of the leaching reaction can be determined by measuring the redox potential (ORP) of the leaching solution.

[Reduction Step]

In the reduction step S3, the leachate obtained in the leaching step S2 is subjected to a reduction treatment using a reducing agent to obtain a reduced solution containing nickel and/or cobalt. Here, in the treatment in the leaching step S2 described above, copper contained in the pulverized sulfide is leached by acid together with nickel and/or cobalt, and dissolved in the solution. A part thereof may remain in the solution without reacting with the sulfurizing agent. Therefore, in the reduction step S3, a trace amount of copper remaining in the leachate is reduced to produce a precipitate containing copper, and the produced precipitate is separated by solid-liquid separation to obtain a reduced solution containing nickel and/or cobalt.

As the reducing agent, for example, a metal that has a lower standard reduction potential than copper can be used. Copper in the leachate can be reduced by contacting the leachate with a metal that has a lower standard reduction potential than copper. As the metal that has a lower standard reduction potential than copper, a metal, including nickel and/or cobalt, is preferably used. The method for treating a sulfide as described in the present embodiment selectively recovers nickel and/or cobalt in the leachate. Since a metal including nickel and/or cobalt, which is a target of recovery in the reduction treatment, is used as the reducing agent, it is industrially advantageous, because of such use eliminating a separate recovery of the reducing agent in the subsequent step.

In addition to the metals described above, a sulfide may also be used as the reducing agent. The sulfide may be a solid, a liquid, or a gas (gaseous sulfide). Further, the sulfide may be a mixture of the above-described metal and sulfur.

With respect to the addition amount of the reducing agent and the reaction temperature, it is preferable to select optimum ranges by performing a test in advance. In addition, in the reduction treatment, it is preferable to monitor the redox potential (ORP) and pH and control them to predetermined ranges, and it is preferable to select optimum ranges by performing a test in advance.

[Oxidation and Neutralization Step]

In the oxidation and neutralization step S4, an oxidation and neutralization treatment is performed by adding an oxidant to the reduced solution obtained in the reduction step S3 and adding a neutralizing agent, thereby applying the oxidation and neutralization treatment to obtain a solution (neutralized solution) containing nickel and/or cobalt. Specifically, in the oxidation and neutralization step S4, an oxidant is added to the reduced solution to cause an oxidation reaction, and a neutralizing agent is added to control the pH of the solution to a predetermined range, whereby a precipitate of iron and/or phosphorus derived from waste LIBs is produced.

Although not an essential aspect in the treatment of the sulfurizing agent, by providing the oxidation and neutralization step S4 in this manner, at least iron and/or phosphorus as impurity components can be separated as a precipitate, and a solution containing purified nickel and/or cobalt (neutralized solution) can be obtained.

As the oxidant, an oxidant such as hydrogen peroxide or hypochlorous acid is preferably used.

It is preferable that addition of the oxidant is controlled to a predetermined range by monitoring the redox potential (ORP) of the solution. Specifically, an oxidant is added to the solution to control ORP (using silver/silver chloride as a reference electrode) to, for example, a range of 380 mV or more and 430 mV or less.

Furthermore, after an oxidant is added to cause an oxidation reaction, a neutralizing agent is added to control the pH of the solution to preferably in a range of 3.8 or more and 4.5 or less. By performing the neutralization treatment by controlling the pH to such a range, at least impurities such as iron and/or phosphorus can be effectively precipitated.

The neutralizing agent is not particularly limited, but alkali such as sodium hydroxide or potassium hydroxide is preferably used.

Herein, in the oxidation and neutralization treatment, an oxidant may be added after adding a neutralizing agent to the reduced solution, and an oxidant and a neutralizing agent may be simultaneously added to the reduced solution. In particular, it is preferable to add a neutralizing agent after adding an oxidant to the reduced solution. For example, in a case in which an oxidant is added to a reduced solution in which the pH is increased by addition of a neutralizing agent, when iron is contained as an impurity, iron is not sufficiently oxidized, and a precipitate (iron precipitate) of $Fe(OH)_3$ is not generated, resulting in insufficient separation of impurities.

<<3. Method For Recovering Valuable Metal from Waste Lithium-Ion Batteries>>

A method for recovering a valuable metal from waste lithium-ion batteries (waste LIBs) will be described. In this method, waste LIBs are subjected to reduction, heating, and melting to obtain a molten body and the molten body is sulfurized to obtain a sulfide containing copper and nickel and/or cobalt (pyrometallurgical treatment step), and this sulfide is leached with acid to obtain a leachate (hydrometallurgical treatment step).

This method is characterized in that the sulfide containing copper and nickel and/or cobalt obtained by subjecting waste LIBs to the pyrometallurgical treatment is subjected to the pulverizing treatment to obtain the pulverized sulfide having a particle size of 800 μm or less, and the pulverized sulfide is subjected to a leaching treatment with an acid under a condition in which a sulfurizing agent is present. As described above, nickel and/or cobalt can be selectively separated from the sulfide containing copper and nickel and/or cobalt, and it is possible to effectively recover a valuable metal contained in the waste LIB. Note that these treatments are the same as those described in the above-described method for treating a sulfide.

EXAMPLES

Hereinafter, examples of the present invention will be described more specifically, but the present invention is not limited to the following examples in any way.

Example 1

A waste lithium-ion battery (waste LIB) was heated, melted, and reduced to obtain a molten body, and a sulfurizing agent was added to the resulting molten body to obtain a sulfide containing copper, nickel, and cobalt. Using this sulfide as a treatment target, the sulfide was subjected to a treatment for separating nickel and cobalt from copper which are contained in the sulfide.

(Pulverizing Step)

Firstly, the sulfide containing copper, nickel, and cobalt was pulverized by a jaw crusher and a vibration mill to obtain a pulverized sulfide having a particle size of 800 μm or less. Incidentally, the particle size of the pulverized sulfide is an average particle size measured based on a laser diffraction scattering method, using a particle size analyzer (SALD-7000 manufactured by Shimadzu Corporation). In addition, Table 1 below shows the results of metal grade obtained by analyzing the obtained pulverized sulfide using an ICP analyzer.

TABLE 1

| | Ni | Co | Cu | Fe | P | S |
|---|---|---|---|---|---|---|
| Metal grade (%) | 8 | 8 | 65 | 1.5 | 0.5 | 17 |

(Leaching Step)

Next, sulfuric acid in a sufficient amount to leach nickel and the pulverized sulfide was prepared. Then, a sulfurizing agent (sulfur) in an amount of 1 equivalent with respect to an amount of copper contained in the pulverized sulfide was added, and the pulverized sulfide was subjected to a leaching treatment with an acid by setting a slurry concentration to 100 g/L under a condition in which a sulfurizing agent was present. This leachate was analyzed by the ICP analyzer. Analytical values (g/L) of each elemental component are shown in Table 2.

(Reduction Step)

At the end of leaching, solid-liquid separation was performed, and a reduction treatment was performed on the obtained leachate using a reducing agent (nickel sulfide), and filtration was performed to separate solid and liquid to obtain a filtrate (reduced solution). The reduced solution was analyzed by the ICP analyzer. Analyses values (g/L) of each element component are shown in Table 2.

(Oxidation and Neutralization Step)

Next, the oxidation and neutralization treatment was performed by adding a hydrogen peroxide solution (oxidant) with a concentration of 30% to the reduced solution obtained, and after the addition of hydrogen peroxide (oxidant), adding an aqueous solution of sodium hydroxide (neutralizing agent), to adjust the oxidation-reduction potential (ORP) to 400 mV or more as determined using a silver/silver chloride electrode as a reference electrode and pH value to 4 or more. After the reaction, the reaction mixture was filtrated to separate solid and liquid to obtain a filtrate (neutralized solution). This filtrate (neutralized solution) was analyzed by the ICP analyzer. Analyses values (g/L) of each element component are shown in Table 2.

TABLE 2

| (g/L) | Ni | Co | Cu | Fe | P |
|---|---|---|---|---|---|
| Leachate | 6 | 6 | 3 | 1.5 | 0.5 |
| Reduced solution | 6 | 6 | 0.001 | 1.5 | 0.5 |
| Neutralized solution | 6 | 6 | 0.001 | 0.001 | 0.001 |

As can be seen from Table 2, the concentration of Cu in the leachate was 3 g/L, which was sufficiently low. From this, it can be seen that nickel and cobalt can be efficiently and selectively separated from copper by subjecting a pulverized sulfide which contains nickel and cobalt and copper and which has a predetermined particle size to a leaching treatment with an acid under a condition in which a sulfurizing agent is present.

The invention claimed is:

1. A method for treating a sulfide comprising copper and nickel and/or cobalt, the method comprising:

pulverizing the sulfide by subjecting the sulfide to a pulverizing treatment to obtain a pulverized sulfide having a particle size of 800 μm or less; and leaching the pulverized sulfide by adding a sulfurizing agent being sulfur to the pulverized sulfide to create conditions where the pulverized sulfide and the sulfurizing agent coexist, and subjecting the pulverized sulfide to a leaching treatment with an acid under the conditions, to obtain a leachate, wherein, in the leaching step, the sulfurizing agent is added in an amount of 1 equivalent or more with respect to total amount of copper contained in the pulverized sulfide, and by subjecting the pulverized sulfide to the leaching treatment, non-sulfidized copper metal contained in the pulverized sulfide is converted to copper sulfide, and copper sulfide contained in the pulverized sulfide is maintained as solid copper sulfide precipitated in the leachate.

2. The method for treating a sulfide according to claim 1, wherein, in the leaching step, a leaching treatment is performed with at least one or more types selected from sulfuric acid, hydrochloric acid, and nitric acid to obtain a leachate.

3. The method for treating a sulfide according to claim 1, further comprising reducing the leachate by using a metal that has a lower standard reduction potential than copper.

4. The method for treating a sulfide according to claim 3, further comprising oxidizing and neutralizing a solution obtained in the reduction step by adding an oxidant and a neutralizing agent to the solution obtained in the reduction step, to obtain a solution containing nickel and/or cobalt.

5. The method for treating a sulfide according to claim 4, wherein the oxidant is one or more types selected from hydrogen peroxide and hypochlorous acid.

6. The method for treating a sulfide according to claim 4, wherein the neutralizing agent is one or more types selected from sodium hydroxide and potassium hydroxide.

7. The method for treating a sulfide according to claim 1, wherein the sulfide is generated by adding a sulfurizing agent to a molten body obtained by reducing, heating, and melting a waste lithium-ion battery.

8. A method for recovering a valuable metal from a waste lithium-ion battery, the method comprising obtaining a leachate by leaching a sulfide comprising copper and nickel and/or cobalt with an acid, the sulfide being generated by sulfurizing a molten body obtained by reducing, heating, and melting the waste lithium-ion battery, wherein the sulfide is subjected to a pulverizing treatment so as to have a particle size of 800 μm or less and the pulverized sulfide is subjected to a leaching treatment with an acid under a condition in which a sulfurizing agent being sulfur is present, wherein the sulfurizing agent is added to the pulverized sulfide in an amount of 1 equivalent or more with respect to total amount of copper contained in the pulverized sulfide to create conditions where the pulverized sulfide and the sulfurizing agent coexist, and by subjecting the pulverized sulfide to the leaching treatment, non-sulfidized copper metal contained in the pulverized sulfide is converted to copper sulfide, and copper sulfide contained in the pulverized sulfide is maintained as solid copper sulfide precipitated in the leachate.

9. A method for recovering a valuable metal from a waste lithium-ion battery, the method comprising a pyrometallurgical treatment, in which the waste lithium-ion battery is reduced, heated, and melted to obtain a molten body, and sulfurizing the molten body to obtain a sulfide containing copper and nickel and/or cobalt, and a hydrometallurgical treatment, in which the sulfide is leached with an acid, wherein, in the hydrometallurgical treatment, the sulfide is pulverized so as to have a particle size of 800 μm or less, and the pulverized sulfide is subjected to a leaching treatment with an acid under a condition in which a sulfurizing agent being sulfur is present, wherein the sulfurizing agent is added to the pulverized sulfide in an amount of 1 equivalent or more with respect to total amount of copper contained in the pulverized sulfide to create conditions where the pulverized sulfide and the sulfurizing agent coexist, and by subjecting the pulverized sulfide to the leaching treatment, non-sulfidized copper metal contained in the pulverized sulfide is converted to copper sulfide, and copper sulfide contained in the pulverized sulfide is maintained as solid copper sulfide precipitated in the leachate.

10. The method for treating a sulfide according to claim 2, further comprising reducing the leachate by using a metal that has a lower standard reduction potential than copper.

11. The method for treating a sulfide according to claim 5, wherein the neutralizing agent is one or more types selected from sodium hydroxide and potassium hydroxide.

12. The method for treating a sulfide according to claim 2, wherein the sulfide is generated by adding a sulfurizing agent to a molten body obtained by reducing, heating, and melting a waste lithium-ion battery.

13. The method for treating a sulfide according to claim 3, wherein the sulfide is generated by adding a sulfurizing agent to a molten body obtained by reducing, heating, and melting a waste lithium-ion battery.

14. The method for treating a sulfide according to claim 4, wherein the sulfide is generated by adding a sulfurizing agent to a molten body obtained by reducing, heating, and melting a waste lithium-ion battery.

15. The method for treating a sulfide according to claim 5, wherein the sulfide is generated by adding a sulfurizing agent to a molten body obtained by reducing, heating, and melting a waste lithium-ion battery.

16. The method for treating a sulfide according to claim 6, wherein the sulfide is generated by adding a sulfurizing agent to a molten body obtained by reducing, heating, and melting a waste lithium-ion battery.

17. The method for treating a sulfide according to claim 1, wherein, in the leaching step, an oxidation-reduction potential (ORP) of the leachate is controlled to be −200 mV or more and 300 mV or less as measured using a silver/silver chloride electrode as a reference.

* * * * *